UNITED STATES PATENT OFFICE.

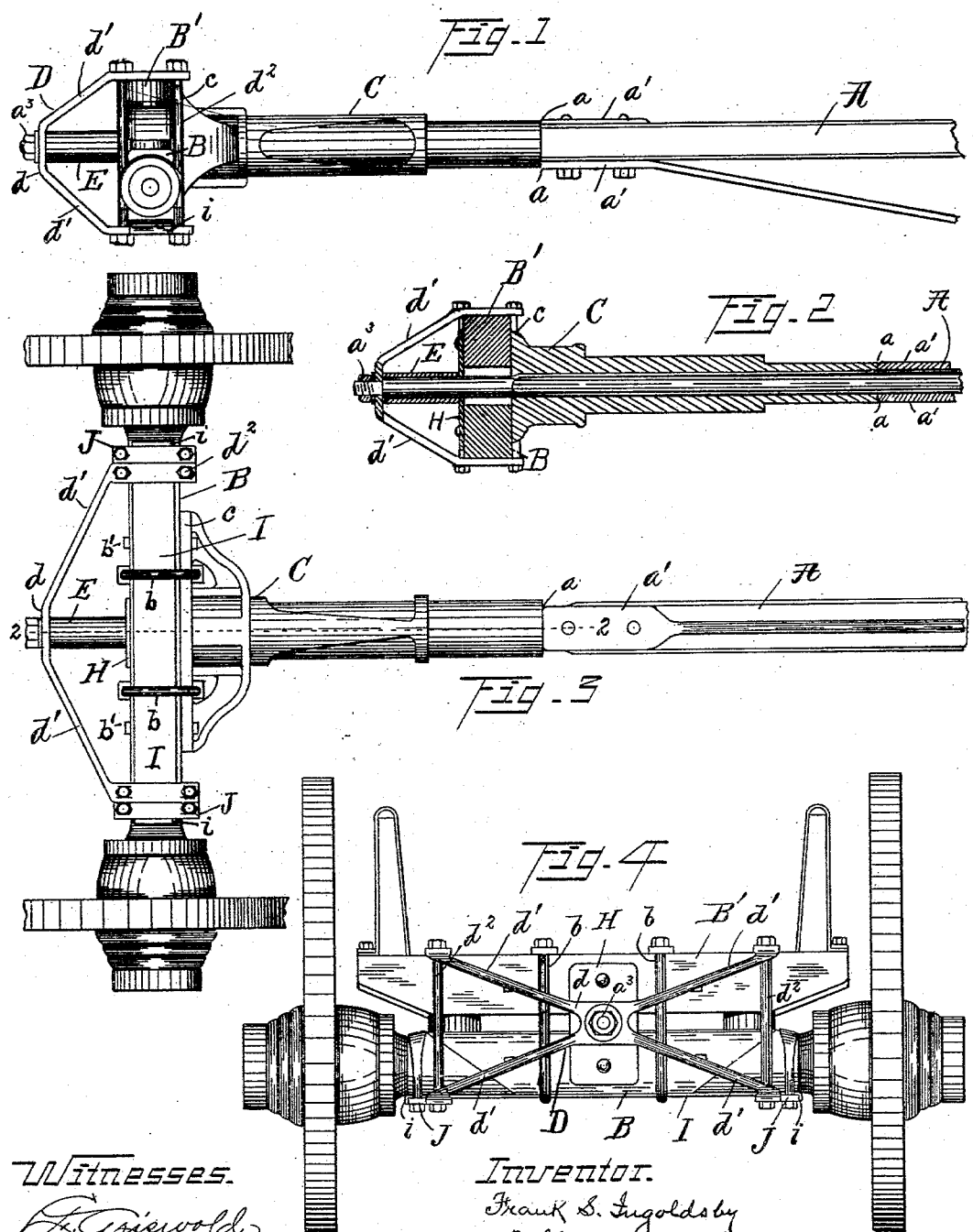

FRANK S. INGOLDSBY, OF DENVER, COLORADO.

REAR COUPLING FOR WAGONS.

SPECIFICATION forming part of Letters Patent No. 551,318, dated December 10, 1895.

Application filed April 1, 1895. Serial No. 544,066. (No model.)

*To all whom it may concern:*

Be it known that I, FRANK S. INGOLDSBY, a citizen of the United States, residing at Denver, in the county of Arapahoe and State of Colorado, have invented certain new and useful Improvements in Rear Couplings for Wagons; and I do hereby declare the following to be a full, clear, and exact description of the invention, such as will enable others skilled in the art to which it appertains to make and use the same.

My invention relates to certain improvements in the rear coupling of wagons.

The principal objects of the invention are, first, to prevent the reach from being broken or twisted when the wheels encounter an obstacle or drop into a rut or hole, or when the wagon is upset; second, to avoid the use of the tension-hounds, which commonly extend diagonally between the reach and the ends of the rear axle.

There are other incidental advantages due to specific features of construction, which will be hereinafter referred to.

The invention consists in the construction and combination of parts, which are hereinafter described and claimed.

In the drawings, Figure 1 is a side elevation of the rear part of a wagon's running-gear which contains my invention. Fig. 2 is a longitudinal vertical sectional view in the plane indicated by line 2 2 in Fig. 3. Fig. 3 is an under view, and Fig. 4 is a rear view, of said running-gear.

Referring to the parts by letters, A represents the reach; B, the rear axle, and B' the rear bolster, which is secured to the axle by the clips $b$ $b$, provided for this purpose, and incidentally by other clips and bolts which are used primarily for other purposes.

C represents a sleeve having formed on its rear end and integral with it a braced foot $c$, which extends in both directions at right angles to the axis of the sleeve. This foot is approximately as broad as the rear axle and bolster taken together, against both of which parts it is held by the clips $b$ $b$, as well as by bolts $b'$. The reach passes through this sleeve C between the bolster and axle, as shown, and through the center plate of the four-armed compression-hound, which I will presently explain. The part of the reach which lies in the sleeve is cylindrical and more or less nicely fitted thereto. In order that this sleeve C shall be strong enough to play an important part in holding the wheels in track, I make it longer than the distance between the axis of the sleeve and the wheels. This makes a long bearing upon the reach, the leverage of which is greater than that of the axle itself, wherefore when either of the wheels strikes an obstruction this greater leverage of the sleeve effectually resists their tendency to be thrown out of track.

With the above-described construction, particularly when taken in connection with the compression-hound to be presently explained, it is unnecessary to use the long tension-hounds which are commonly found in wagons, extending from the reach to points near the ends of the axle.

It is particularly desirable to dispense with the old-style tension-hounds, above mentioned, in wagons having swinging bottom doors which are dropped to dump the load. When the old-style hounds are used, the wagon-box must either be set very high, so that the doors can clear the hounds as they drop to the vertical position, or else the doors cannot be opened widely, and, in opening as wide as possible, will strike the hounds. The front end of the sleeve C abuts against the shoulder or shoulders $a$ on the reach, which shoulders are preferably the rear ends of plates $a'$, which are riveted to said reach. In backing the wagon the thrust is between these shoulders and the front end of the sleeve.

The compression-hound D consists of the center plate $d$, through which the reach passes, as before explained, and four arms $d'$ $d'$, which are formed integral with said plate and are secured at their ends to the bolster and axle near their ends. A nut $a^3$ screws onto the rear end of the reach against the center plate of the compression-hound, and the strain incidental to pulling the wagon is transmitted from said nut through the compression-hound to the rear axle and its bolster near their ends. To strengthen the middle part of the compression-hound, a sleeve E surrounds the reach and lies between the center plate of the hound and the axle and bolster, abutting both. This sleeve prevents the pull on the reach from bending the middle part of the hound forward. Preferably a metal plate H is bolted to the rear side of the bolster and axle, in which case the front end of the sleeve E abuts against it. This plate, moreover, assists in rigidly connecting the bolster and axle together.

In the best construction the arms $d'$ of the compression-hound, on both sides of the center, lie respectively on the top of the bolster and against the under side of the axle, where they are held by tie-bolts $d^2$, binding them together. In order to prevent the legs from spreading, a tie-plate I is secured to the under side of the axle, having its ends turned down to form shoulders $i$, which resist the tendency of the hound-arms to spread outward. In the construction as shown the clips J, which secure the axle-spindles to the axle, lie directly against the shoulders $i$, and the ends of the lower hound-arms lie against said clips; but obviously the effect would be substantially the same if the ends of the hound-arms were directly in contact with said shoulders $i$.

With the above-described construction there is no tendency to twist the reach, since it may turn freely in the sleeve C. At the same time the relatively long bearing of the reach in said sleeve, together with the compression-hound constructed and connected as described, keeps the wheels in track without the use of the tension-hounds usually employed for this purpose.

It is clear that with the above-described construction, when the box is taken off of the running-gear, the rear axle may turn a complete circle upon the reach. This is a valuable feature of construction under certain conditions, as follows: If the wagon in being used on a hillside, for example, is overturned, the wagon-box will become disconnected from the running-gear, and then if the running-gear should roll down the hill there would be comparatively little danger of breaking any of the parts by means of which the reach and rear axle are connected.

Having described my invention, I claim—

1. In a wagon, the combination of the rear axle and bolster, and a sleeve having at its rear end an integral foot extending at right angles to the axis of the sleeve and in opposite directions, said foot being wide enough to span both axle and bolster, and bolts connecting said foot to both axle and bolster, with a cylindrical reach which passes through the sleeve and beyond the rear axle and bolster, a nut on the rear end of the reach, and shoulders on the reach abutting the front end of said sleeve, substantially as and for the purpose specified.

2. In a wagon, the combination of the rear axle and bolster, a cylindrical sleeve which is secured to said parts, the cylindrical reach which passes through and is adapted to turn in said sleeve and extends rearward beyond said axle and bolster, a shoulder on the reach abutting the front end of said sleeve, a compression hound which is secured to the rear axle and bolster and through which the rear end of the reach passes, and a nut on the rear end of said reach engaging with said hound, substantially as and for the purpose specified.

3. In a wagon, the combination of the rear axle and bolster, with a compression hound having a center plate and four arms which are secured to the bolster and axle near the ends thereof, with a cylindrical reach passing through a hole in the rear axle and bolster and through the center plate of said compression hound, and a nut on the end of said reach, substantially as and for the purpose specified.

4. In a wagon, the combination of the rear axle and bolster, with a compression hound having a center plate and four arms which are secured to the said axle and bolster, a reach which passes through a hole in said axle and bolster and through the center plate of said hound, a nut on the end of said reach, and a sleeve surrounding the reach and lying between the hound and the axle and bolster, substantially as and for the purpose specified.

5. In a wagon, the combination of the rear axle and bolster, with a compression hound having a center plate and four arms, tie bolts for securing said hound arms to the axle and bolster, and a tie plate secured to the axle having shoulders which resist the spreading of said hound arms, substantially as and for the purpose specified.

In testimony whereof I affix my signature in presence of two witnesses.

FRANK S. INGOLDSBY.

Witnesses:
EDWIN L. THURSTON,
L. F. GRISWOLD.